United States Patent
Rajadurai et al.

(10) Patent No.: US 10,693,568 B2
(45) Date of Patent: Jun. 23, 2020

(54) ADAPTING SERDES RECEIVERS TO A UFS RECEIVER PROTOCOL

(71) Applicant: Advantest Corporation, Tokyo (JP)

(72) Inventors: Sivanarayana Pandian Rajadurai, San Jose, CA (US); Alan Starr Krech, Jr., San Jose, CA (US); Preet Paul Singh, San Jose, CA (US); Darrin Paul Albers, San Jose, CA (US)

(73) Assignee: ADVANTEST CORPORATION, Tokyo (JP)

(*) Notice: Subject to any disclaimer, the term of this patent is extended or adjusted under 35 U.S.C. 154(b) by 0 days.

(21) Appl. No.: 16/408,208

(22) Filed: May 9, 2019

(65) Prior Publication Data

US 2020/0036453 A1   Jan. 30, 2020

Related U.S. Application Data

(60) Provisional application No. 62/711,185, filed on Jul. 27, 2018.

(51) Int. Cl.
   *H04B 17/00*   (2015.01)
(52) U.S. Cl.
   CPC ................... *H04B 17/0085* (2013.01)

(58) Field of Classification Search
   CPC ..... H04L 1/20; H04L 1/24; G01R 31/318307; G01R 31/2601
   USPC .......................................... 375/224; 702/119
   See application file for complete search history.

(56) References Cited

U.S. PATENT DOCUMENTS

| | | | |
|---|---|---|---|
| 2014/0236525 A1* | 8/2014 | Chan ................ | G01R 31/31907 702/119 |
| 2014/0244204 A1* | 8/2014 | Frediani ........... | G01R 31/31907 702/119 |
| 2018/0267101 A1* | 9/2018 | Champoux ............ | G01R 35/00 |

* cited by examiner

*Primary Examiner* — Khai Tran

(57) ABSTRACT

A method for receiving data using an FPGA receiver circuit comprises receiving payload data from a DUT using a first rate of a plurality of line rates during a first burst, wherein the DUT is communicatively coupled to the FPGA receiver circuit. The method further comprises transitioning to a power saving state at an end of the first burst and receiving synchronization data from the DUT using a second rate of a plurality of line rates during a second burst. Further, the method comprises establishing synchronization with a clock data recovery (CDR) circuit of the FPGA receiver circuit at the second rate and receiving payload data from the DUT at the second rate.

24 Claims, 12 Drawing Sheets

TABLE 1  HS-BRUST: RATE Series and GEARs

| RATE A-series (Mbps) | RATE B-series[1] (Mbps) | High-Speed GEARs |
|---|---|---|
| 1248 | 1457.6 | HS-G1 (A/B) |
| 2496 | 2915.2 | HS-G2 (A/B) |
| 4992 | 5830.4 | HS-G3 (A/B) |
| 9984 | 11660.8 | HS-G4 (A/B) |

1. The B-series rates shown are not integer multiples of common reference frequencies 19.20 MHz or 26.00 MHz, but are within the tolerance range of 2000 ppm.

TABLE 2  PWM-BRUST GEARs

| PWM GEARs | Min. (Mbps) | Max. (Mbps) |
|---|---|---|
| PWM-G0 | 0.01 | 3 |
| PWM-G1 | 3 | 9 |
| PWM-G2 | 6 | 18 |
| PWM-G3 | 12 | 36 |
| PWM-G4 | 24 | 72 |
| PWM-G5 | 48 | 144 |
| PWM-G6 | 96 | 288 |
| PWM-G7 | 192 | 576 |

FIG. 6

| DRP Address | Attributes | Gear 4 (11.6736 Gbps) | Gear 3 (11.6736 Gbps) | Gear 2 (2.9184 Gbps) | Gear 1 (1.4592 Gbps) |
|---|---|---|---|---|---|
| 0092h | GTYE_CHANNEL_ADAPT_CFG1 | (16'b1111101100011100), | (16'b1111101100011100), | G3 value | G3 value |
| 00C3h | GTYE_CHANNEL_PCIE_BUFG_DIV_CTRL | (16'b0011010100000000000), | (16'b0000100000000000), | G3 value | G3 value |
| 00ADh | GTYE_CHANNEL_PCIE_PLL_SEL_MODE_GEN12 | (2'b10), | (2'b00), | | |
| 0010h | GTYE_CHANNEL_RXCDR_CFG2 | (16'b0000000111101001), | (16'b0000000111011001), | (16'b0000000101011001) | (16'b0000000110111001) |
| 0135h | GTYE_CHANNEL_RXCDR_CFG2_GEN2 | (16'b1001011001), | (16'b1001011001), | (10'b1001001001) | (10'b1000111001) |
| 00A4h | GTYE_CHANNEL_RXCDR_CFG2_GEN3 | (16'b0000000100101001), | (16'b0000000100101001), | (16'b0000000100101001) | (16'b0000000100011001) |
| 0063h | GTYE_CHANNEL_RXOUT_DIV | (1), | (1), | -4 | -8 |
| 00D3h | GTYE_CHANNEL_RX_XMODE_SEL | (1'b0), | (1'b1) | G3 value | G3 value |

FIG. 8

State diagram for type-IM-RX

ADAPTING SERDES RECEIVERS TO A UFS RECEIVER PROTOCOL

CROSS-REFERENCE TO RELATED APPLICATIONS

This application is a conversion of and claims priority to and the benefit of Provisional Patent Application No. 62/711, 185, entitled "ADAPTING SERDES RECEIVER TO UFS RX PROTOCOL," having a filing Date of Jul. 27, 2018, which is herein incorporated by reference in its entirety.

FIELD OF THE INVENTION

The present disclosure relates generally to the field of electronic device testing systems and more specifically to the field of electronic device testing equipment for testing devices under test (DUTs).

BACKGROUND OF THE INVENTION

Automated test equipment (ATE) can be any testing assembly that performs a test on a semiconductor device or electronic assembly. ATE assemblies may be used to execute automated tests that quickly perform measurements and generate test results that can then be analyzed. An ATE assembly may be anything from a computer system coupled to a meter, to a complicated automated test assembly that may include a custom, dedicated computer control system and many different test instruments that are capable of automatically testing electronics parts and/or semiconductor wafer testing, such as system-on-chip (SOC) testing or integrated circuit testing. ATE systems both reduce the amount of time spent on testing devices to ensure that the device functions as designed and serve as a diagnostic tool to determine the presence of faulty components within a given device before it reaches the consumer.

FIG. 1 is a schematic block diagram of a conventional automatic test equipment body 100 for testing certain typical DUTs, e.g. a semiconductor memory device such as a DRAM. The ATE includes an ATE body 100 with hardware bus adapter sockets 110A-110N. Hardware bus adapter cards 110A-110N specific to a particular communication protocol e.g. PCIe, USB, SATA, SAS etc., connect to the hardware bus adapter sockets provided on the ATE body and interface with the DUTs via cables specific to the respective protocol. The ATE body 100 also includes a tester processor 101 with an associated memory 108 to control the hardware components built into the ATE body 100 and to generate the commands and data necessary to communicate with the DUTs being tested through the hardware bus adapter cards. The tester processor 101 communicates with the hardware bus adapter cards over system bus 130. The tester processor may be programmed to include certain functional blocks including a pattern generator 102 and a comparator 106. Alternatively, the pattern generator 102 and comparator 106 may be hardware components mounted on an expansion or adapter card that plug into the ATE body 100.

The ATE body 100 tests the electrical functions of the DUTs 112A-112N connected to the ATE body 100 through hardware bus adapters plugged into the hardware bus adapter sockets of the ATE body 100. Accordingly, the tester processor 101 is programmed to communicate test programs to the DUTs using the protocol unique to the hardware bus adapters. Meanwhile, the other hardware components built into the ATE body 100 communicate signals with each other and with the DUTs according to test programs operating in the tester processor 101.

The test program run by the tester processor 101 may include a function test which involves writing input signals created by the pattern generator 102 to the DUTs, reading out the written signals from the DUTs and using the comparator 106 to compare the output with the expected patterns. If the output does not match the input, the tester processor 101 will identify the DUT as being defective. For example, if the DUT is a memory device such as a DRAM, the test program will write data generated by the pattern generator 102 to the DUT using a Write Operation, read data from the DRAM using a Read Operation and compare the expected bit pattern with the read pattern using the comparator 106.

In conventional systems, the tester processor 101 needs to contain the functional logic blocks to generate the commands and test patterns used in testing the DUTs, such as the pattern generator 102 and the comparator 106, programmed in software directly on the processor. However, in some instances certain functional blocks such as the comparator 106 may be implemented on a field programmable gate array (FPGA), which is an application specific integrated circuit (ASIC) type semiconductor device that can program logic circuits according to a user's demand.

The FPGAs used in conventional systems rely on the tester processor 101 to transfer the commands and test patterns to the FPGA, which the FPGA in turn relays over to the DUTs. Because the tester processor, and not the FPGA, is responsible for generating the commands and test patterns, the number and type of DUTs that can be tested with a given ATE body is limited by the processing capabilities and programming of the tester processor. Where the tester processor generates all the commands and test patterns, bandwidth constraints on the system bus 130 connecting the tester processor to the various hardware components, including any FPGA devices and hardware bus adapter sockets, also places an upper limit on the number of DUTs that can tested simultaneously.

Also, in conventional systems, the communication protocol used to communicate with the DUTs is fixed because the hardware bus adapter cards that plug into the ATE body 100 are single purpose devices that are designed to communicate in only one protocol and cannot, generally, be reprogrammed to communicate in a different protocol. For example, an ATE body configured to test PCIe devices will have hardware bus adapter cards plugged into the body that support only the PCIe protocol. In order to test DUTs supporting a different protocol, e.g., Universal Flash Storage (UFS), the user would ordinarily need to replace the PCIe hardware bus adapter cards with bus adapter cards supporting the UFS protocol. Unless the PCIe hardware bus adapter cards are physically substituted with cards supporting the other protocol, such a system can only test DUTs that support the PCIe protocol. Thus, on the test floor, critical time is consumed replacing hardware bus adapter cards when DUTs running a different protocol from the one that the existing adapter cards support need to be tested.

Another drawback of current tester systems is that most off-the-shelf FPGA systems are not configured to provide native support for UFS protocols. The UFS protocol is a high-speed communication protocol between a Host Controller and a memory device. The key benefit of the UFS protocol is that it consumes less power than other protocols, e.g., PCIe. To reduce power usage, the UFS protocol supports varying speed modes (including high speed gears and low speed gears) and also certain power saving states. However, supporting the different speed gears (or different speed modes) and power saving states in the UFS specification requires special accommodations in the hardware. UFS is not currently as widely adopted as PCIe and, therefore, off-the-shelf FPGAs do not natively support all the various modes (including the low speed gears and certain power saving states) specified in the UFS specification. Accordingly, conventional ATE systems that use FPGAs to communicate with DUTs are not able to adequately test DUTs that are UFS-compliant.

BRIEF SUMMARY OF THE INVENTION

Accordingly, a need exists for a tester architecture that can address the problems with the systems described above. What is needed is a test architecture whereby the command and test pattern generation functionality can be transferred onto the FPGA, so that the processing load on the tester processor and the bandwidth requirements on the system bus can be significantly reduced. This would be more efficient than prior configurations where the tester processor bore the entire processing load and the system bus conveyed test data and commands for all the DUTs connected to the ATE body. Further, what is needed is a test architecture whereby the communicative protocol engine can be programmed on FPGA devices so that the protocol used to communicate with the DUTs is reconfigurable.

In addition, what is needed is a tester system wherein the FPGA devices are configured to support UFS-compliant DUTs. In other words, the FPGA devices in the ATE systems need to be configured in a way such that they provide support for certain modes (e.g., different speed gears and certain power saving states) specified in the UFS specification—by comparison, off-the-shelf FPGAs would not contain such support.

Embodiments of the present invention use Serializer/Deserializer (SerDes) channels in off-the-shelf FPGAs to communicate with UFS-compliant DUTs. Off-the-shelf FPGAs, in conventional testers, do not support multiple speed modes (e.g., 4 speed modes) that a UFS host (e.g., the FPGA), compliant to the USF 3.0 standard, should support. A UFS-compliant host should support 4 speed modes (also referred to as 'gears') in high-speed mode, e.g., Gear4 (G4) 11.66 Gbps, a G3 5.83 Gbps, G2 2.915 Gbps, and G1 1.457 Gbps. Embodiments of the present invention support the 4 speed modes by allowing a change of the line rate for each gear that is implemented in the SerDes channels of the FPGA. Whenever there is a transition from one high speed gear to another high speed gear, the FPGA SerDes transceiver settings are changed dynamically to force the line rate of the transceiver to that of the new gear.

In one embodiment, a method for receiving data using an FPGA receiver circuit is disclosed. The method comprises receiving payload data from a DUT using a first rate of a plurality of line rates during a first burst, wherein the DUT is communicatively coupled to the FPGA receiver circuit. The method further comprises transitioning to a power saving state at an end of the first burst and receiving synchronization data from the DUT using a second rate of a plurality of line rates during a second burst. Further, the method comprises first establishing synchronization with a clock data recovery (CDR) circuit of the FPGA receiver circuit at the second rate and then receiving payload data from the DUT at the second rate.

In another embodiment, an automated test equipment (ATE) system is disclosed. The system comprises a computer system comprising a system controller communicatively coupled to a tester processor and an FPGA. The FPGA is communicatively coupled to the tester processor, wherein the FPGA is configured to internally generate commands and data transparently from the tester processor for testing a DUT. The FPGA comprises a transceiver circuit, wherein the transceiver circuit is configured to a) receive payload data from the DUT using a first rate of a plurality of line rates during a first burst, b) transition to a power saving state at an end of the first burst; c) receive synchronization data from the DUT using a second rate of a plurality of line rates during a second burst; d) establish synchronization with a clock data recovery (CDR) circuit of the transceiver at the second rate; and then e) receive payload data from the DUT at the second rate.

In a different embodiment, an automated test equipment (ATE) apparatus is disclosed. The apparatus comprises an FPGA communicatively coupled to a DUT using a UFS protocol over a Serializer/Deserializer (SERDES) channel, wherein the FPGA comprises a receiver circuit, wherein the receiver circuit is configured to: a) receive payload data from the DUT using a first rate of a plurality of line rates during a first burst; b) transition to a power saving state at an end of the first burst; c) receive synchronization data from the DUT using a second rate of a plurality of line rates during a second burst during a dedicated state for performing synchronization; d) establish synchronization with a clock data recovery (CDR) circuit of the receiver circuit at the second rate; and then e) receive payload data from the DUT at the second rate.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 6 illustrates line rates for both high-speed and low-speed gears as required by the UFS specification.

FIG. 8 illustrates a sub-set of CDR attributes that change for the different UFS gear speeds (or line rates) and the corresponding Dynamic Reconfiguration Port (DRP) addresses as required by the FPGA specification.

DETAILED DESCRIPTION OF THE INVENTION

Figure 1:
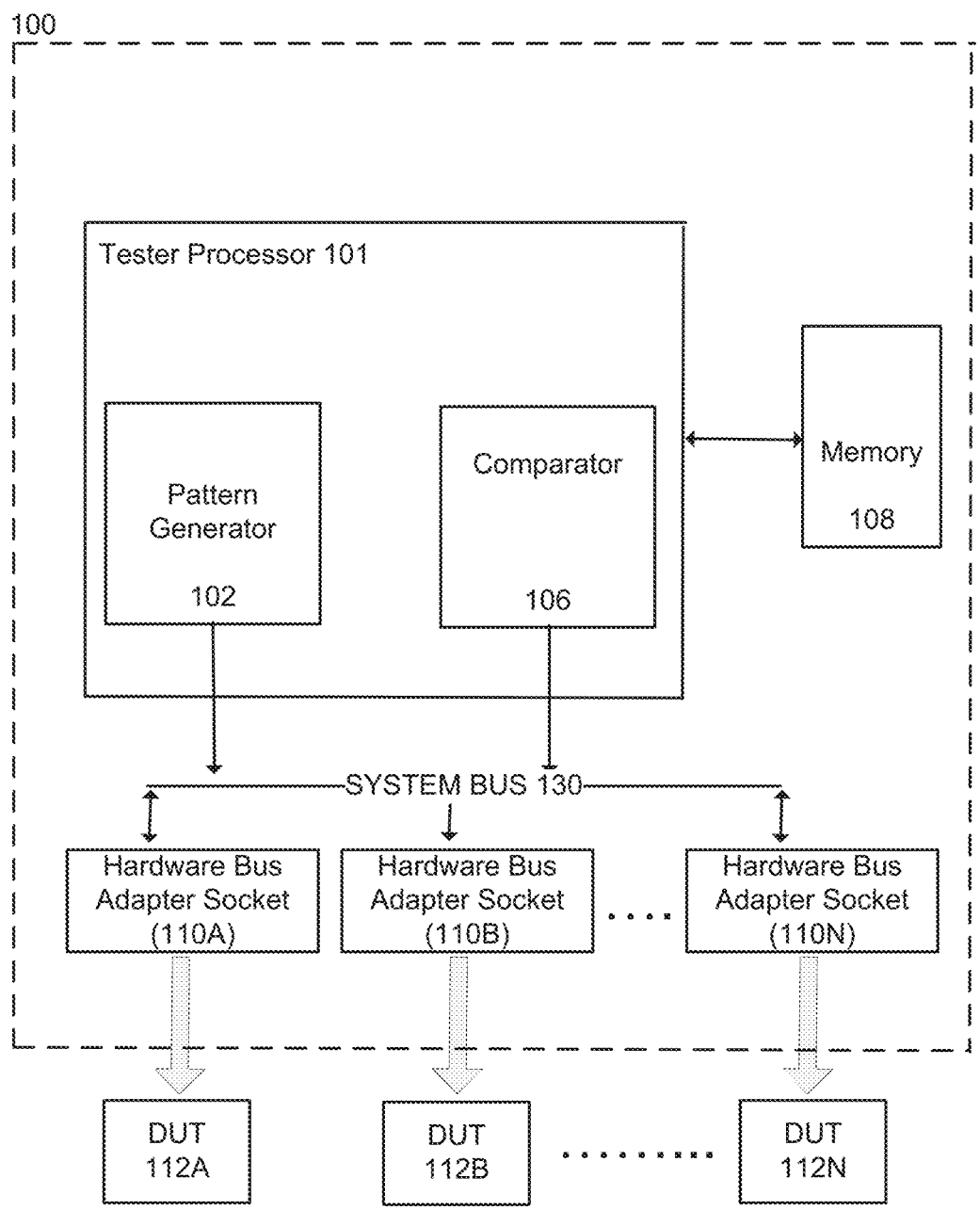
FIG. 1 is a schematic block diagram of a conventional automatic test equipment body for testing a typical device under test (DUT).

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Notation and Nomenclature Section

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "coupling," "communicating," "selecting," "driving," "transmitting," "receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The description below provides a discussion of computers and other devices that may include one or more modules. As used herein, the term "module" or "block" may be understood to refer to software, firmware, hardware, and/or various combinations thereof. It is noted that the blocks and modules are exemplary. The blocks or modules may be combined, integrated, separated, and/or duplicated to support various applications. Also, a function described herein as being performed at a particular module or block may be performed at one or more other modules or blocks and/or by one or more other devices instead of or in addition to the function performed at the described particular module or block. Further, the modules or blocks may be implemented across multiple devices and/or other components local or remote to one another. Additionally, the modules or blocks may be moved from one device and added to another device, and/or may be included in both devices. Any software implementations of the present invention may be tangibly embodied in one or more storage media, such as, for example, a memory device, a floppy disk, a compact disk (CD), a digital versatile disk (DVD), or other devices that may store computer code.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art.

Adapting SERDES Receivers to a UFS Receiver Protocol

Embodiments of the present invention provide a tester system wherein the FPGA devices are configured to connect with and test multiple UFS-compliant DUTs concurrently. In other words, the FPGA devices in the ATE systems are configured in a way such that they provide support for certain speed modes (e.g., high speed gears) specified in the UFS specification.

Embodiments of the present invention use Serializer/Deserializer (SerDes) channels in off-the-shelf FPGAs to communicate with UFS-compliant DUTs. Off-the-shelf FPGAs, in conventional testers, do not support multiple speed modes (e.g., 4 speed modes) that a UFS host (e.g., the FPGA), compliant to the USF 3.0 standard, should support. A UFS-compliant host should support 4 speed modes (also referred to as 'gears') in high-speed mode, e.g., Gear4 (G4) 11.66 Gbps, a G3 5.83 Gbps, G2 2.915 Gbps, and G1 1.457 Gbps and also various low-speed gears. Embodiments of the present invention support the 4 speed modes by allowing a change of the line rate for each gear that is implemented in the SerDes channels of the FPGA. Whenever there is a transition from one high speed gear to another high speed gear, the FPGA SerDes transceiver settings are changed dynamically to force the line rate of the transceiver to that of the new gear.

Figure 2:
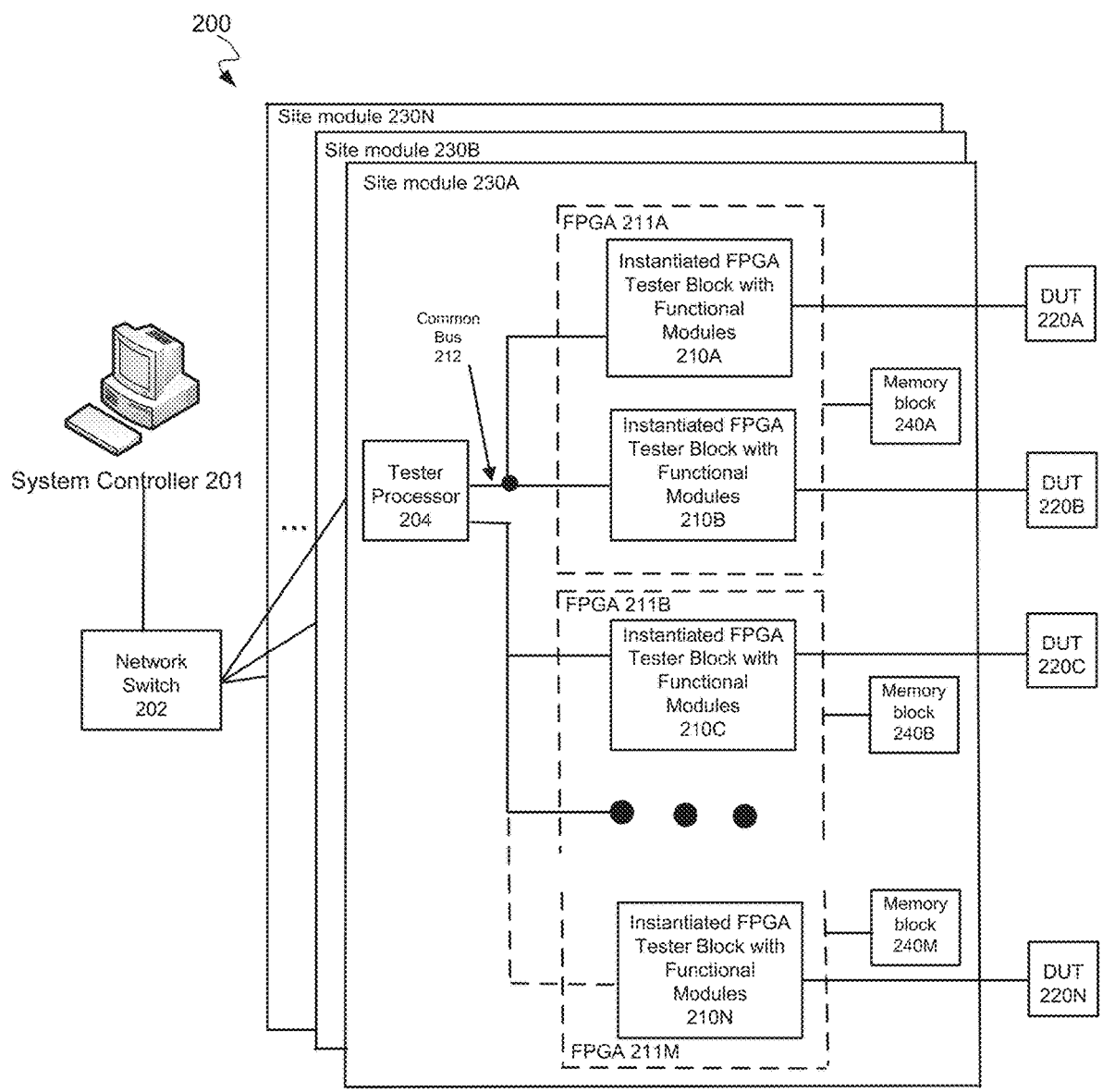
FIG. 2 is a high level schematic block diagram of the interconnections between the system controller, the site modules and the DUTs according to one embodiment of the present invention.

FIG. 2 is an exemplary high level block diagram of the automatic test equipment (ATE) apparatus 200 in which a tester processor is connected to the devices under test (DUTs) through FPGA devices with built-in functional modules in accordance with an embodiment of the present invention. In one embodiment, ATE apparatus 200 may be implemented within any testing system capable of testing multiple DUTs simultaneously.

Referring to FIG. 2, an ATE apparatus 200 for testing semiconductor devices more efficiently in accordance with an embodiment of the present invention includes a system controller 201, a network switch 202 connecting the system controller to the site module boards 230A-230N, FPGA devices 211A-211M comprising instantiated FPGA tester blocks 210A-210N, memory block modules 240A-240M wherein each of the memory blocks is connected to one of the FPGA devices 211A-211M, and the devices under test (DUTs) 220A-220N, wherein each device under test 220A-220N is connected to one of the instantiated FPGA tester blocks 210A-210N. It should be noted that the DUTs 220A-220N can, in one embodiment, be solid state drives (SSDs). Furthermore, it is possible for a single instantiated FPGA tester block, as shown in FIG. 2, to also be connected to multiple DUTs. The DUTs may communicate to the FPGA blocks using one or more of several different protocols, including PCIe and UFS.

In one embodiment, the system controller 201 may be a computer system, e.g., a personal computer (PC) that provides a user interface for the user of the ATE to load the test programs and run tests for the DUTs connected to the ATE 200. In one embodiment, the system controller 201 may be running the Windows operation system (OS). The Advantest Stylus software executing in the Windows environment is one example of test software normally used during device testing. It provides the user with a graphical user interface from which to configure and control the tests. It can also comprise functionality to control the test flow, control the status of the test program, determine which test program is running, and log test results and other data related to test flow. In one embodiment, the system controller can be connected to and control as many as 512 DUTs, for example.

In one embodiment, the system controller 201 can be connected to the site module boards 230A-230N through a network switch, such as an Ethernet switch. In other embodiments, the network switch may be compatible with a different protocol such as TCP/IP, Fibre Channel, 802.11 or ATM, for instance.

In one embodiment, each of the site module boards 230A-230N may be a separate standalone board that attaches to custom-built load board fixtures, on which the DUTs 220A-220N are loaded, and also to the system controller 201 from where the test programs are received. In other embodiments, the site module boards may be implemented as plug-in expansion cards or as daughter boards that plug into the chassis of the system controller 201 directly. Alternatively, the site module boards may be housed within a stand-alone enclosure and may connect to the various DUTs using a device interface board (DIB).

The site module boards 230A-230N can each comprise at least one tester processor 204 and at least one FPGA device. In one embodiment, the tester processor and its associated memory may be located on a separate board (not shown) affixed to the respective site module. This separate board may be called a Computer On Module (or COM) board. In other words, the FPGA may be located on a site module board while the tester processor (with an associated memory) is located on a COM board.

The tester processor 204 and the FPGA devices 211A-211M on the site module board run the test methods for each test case in accordance with the test program instructions received from the system controller 201. In one embodiment the tester processor can be a commercially available Intel x86 CPU or any other well-known processor. Further, the tester processor may be operating on the Ubuntu OS x64 operating system and running the Core Software, which allows it to communicate with the software running on the system controller, to run the test methods. In one embodiment, the tester processor 204 may be an x86 processor running the Linux OS or a modified version of the Linux OS. In one embodiment, the Linux OS running on the tester processor is able to receive commands and data from the Windows OS running on the system controller. The tester processor 204 controls the FPGA devices on the site module and the DUTs connected to the site module based on the test program received from the system controller.

The tester processor 204 is connected to and can communicate with the FPGA devices over bus 212. In one embodiment, tester processor 204 communicates with each of the FPGA devices 211A-211M over a separate dedicated bus. In one embodiment, for example in the standard or bypass mode, tester processor 204 can control the testing of the DUTs 220A-220N transparently through the FPGAs with minimal processing functionality allocated to the FPGA devices. In this embodiment, the data traffic capacity of bus 212 can be exhausted rapidly because all the commands and data generated by the tester processor need to be communicated over the bus to the FPGA devices. In other embodiments, the tester processor 204 can share the processing load by allocating functionality to control the testing of the DUTs to the FPGA devices, e.g., in protocol independent data accelerations (PIDA) or full acceleration (FA) modes as will be discussed further below. In these embodiments, the traffic over bus 212 is reduced because the FPGA devices can generate their own commands and data.

In one embodiment, each of the FPGA devices 211A-211M is connected to its own dedicated memory block 240A-240M. These memory blocks can, among other things, be utilized to store the test pattern data that is written out to the DUTs. In one embodiment, each of the FPGA devices can comprise two instantiated FPGA tester blocks 210A-210B with functional modules for performing functions including implementation of communicative protocol engines and hardware accelerators as described further herein. Memory blocks 240A-240 M can each contain one or more memory modules, wherein each memory module within the memory block can be dedicated to one or more of the instantiated FPGA tester blocks 210A-210B. Accordingly, each of the instantiated FPGA tester blocks 210A-210B can be connected to its own dedicated memory module within memory block 240A. In another embodiment, instantiated FPGA tester blocks 210A and 210B can share one of the memory modules within memory block 240A. In a different embodiment, each FPGA device can have multiple instantiated FPGA tester blocks, each with a respective memory block.

Further, each of the DUTs 220A-220N in the system can be connected to a dedicated instantiated FPGA tester block 210A-210N in a "tester per DUT" configuration, wherein each DUT gets its own tester block. This allows separate test execution for each DUT. The hardware resources in such a configuration are designed in a manner to support individual DUTs with minimal hardware sharing. This configuration also allows many DUTs to be tested in parallel, where each DUT can be connected to its own dedicated FPGA tester block and be running a different test program. In a different embodiment, each instantiated FPGA tester block may also be connected to and configured to test multiple DUTs.

The architecture of the embodiment of the present invention depicted in FIG. 2 has several advantages. First, it eliminates the need for protocol-specific hardware bus adapter sockets and cards in the system because the communication protocol modules can be programmed directly on the instantiated FPGA tester blocks within the FPGA devices. The instantiated tester blocks can be configured to communicate with the DUTs in any protocols that the DUTs support, e.g., PCIe, UFS, SATA etc. Accordingly, if DUTs with different protocol support need to be tested, they can be connected to the same system and the FPGAs can be reprogrammed with support for the associated protocols. As a result, one ATE body can be easily configured to test DUTs supporting many different types of protocols.

In one embodiment, new protocols can be downloaded and installed directly on the FPGAs via a simple bit-stream download from a cache on system controller 201 without any kind of hardware interactions. An FPGA will typically include a configurable interface core (or IP core) that is programmable to provide functionality of one or more protocol based interfaces for a DUT and is programmable to interface with the DUT. For example, the FPGAs 211A-211M in the ATE apparatus 200 will include an interface core that can be configured with the PCIe protocol to test PCIe devices initially and subsequently reconfigured via a software download to test UFS-compliant devices. Also, if a new protocol is released, the FPGAs can easily be configured with that protocol via a bit-stream download instead of having to physically switch all the hardware bus adapter cards in the system. Finally, if a non-standard protocol needs to be implemented, the FPGAs can nonetheless be configured to implement such a protocol.

In another embodiment, the FPGAs 211A-211M can be configured to run more than one communicative protocol, wherein these protocols also can be downloaded from system controller 201 and configured through software. In other words, each FPGA implements custom firmware and software images to implement the functionality of one or more PC based testers in a single chip. The required electrical signaling and protocol-based signaling is provided by on-chip IP cores in the FPGAs. As mentioned above, each FPGA is programmable with pre-verified interface or IP cores. This ensures compliance and compatibility according to a given interface standard. The programmable nature of the FPGA is utilized to optimize flexibility, cost, parallelism and upgradeability for storage testing applications from SSDs, HDDs and other protocol based storage devices.

For instance, instantiated FPGA tester block 210A can be configured to run the PCIe protocol while instantiated FPGA tester block 210B can be configured to run the UFS protocol. This allows the tester hardware to test DUTs supporting different protocols simultaneously. FPGA 211A can now be connected to test a DUT that supports both PCIe and UFS protocols. Alternatively, it can be connected to test two different DUTs, one DUT supporting the PCIe protocol and the other DUT supporting the UFS protocol, where each instantiated functional module (e.g., 210A, 210B) is configured with a protocol to test the respective DUT it is connect to.

In one embodiment, the interface or IP core in the FPGA may be acquired from a third party vendor but may require some customization to be compatible with the embodiments described herein. In one embodiment, the interface core provides two functions: a) wraps storage commands into a standard protocol for transmission over a physical channel; and 2) is the electrical signal generator and receiver.

The other major advantage of the architecture presented in FIG. 2 is that it reduces processing load on the tester processor 204 by distributing the command and test pattern generating functionality to FPGA devices, where each DUT has a dedicated FPGA module running the test program specific to it. For instance, instantiated FPGA tester block 210A is connected to DUT 220A and runs test programs specific to DUT 220A. The hardware resources in such a configuration are designed in a manner to support individual DUTs with minimal hardware sharing. This "tester per DUT" configuration also allows more DUTs to be tested per processor and more DUTs to be tested in parallel. Furthermore, with the FPGAs capable of generating their own commands and test patterns in certain modes, the bandwidth requirements on bus 212 connecting the tester processor with the other hardware components, including FPGA devices, device power supplies (DPS) and DUTs, is also reduced. As a result more DUTs can be tested simultaneously than in prior configurations. In other words, without the tester processor 204 acting as a bottleneck, each of the FPGAs can connect to several DUTs and test them concurrently.

Figure 3:
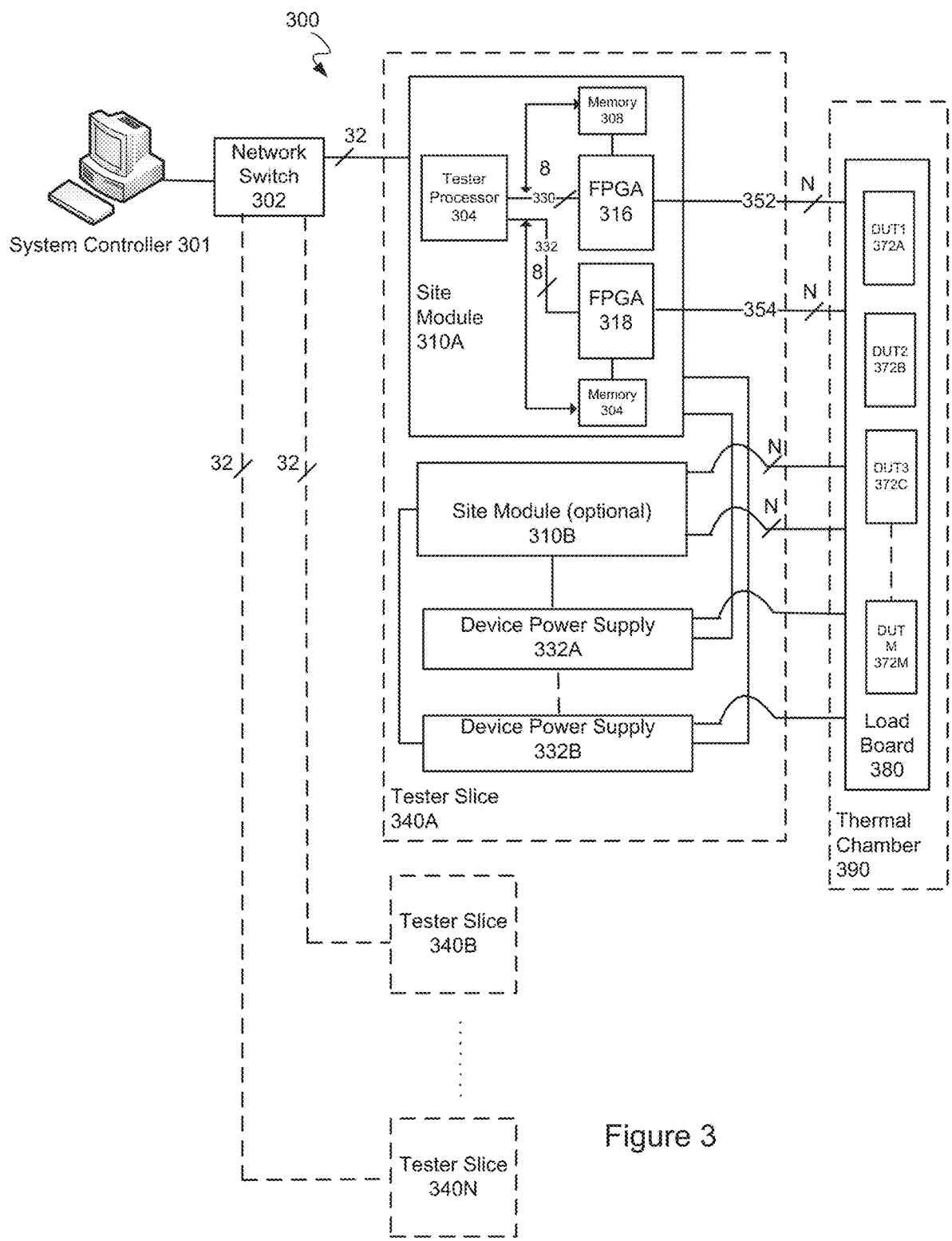
FIG. 3 is a detailed schematic block diagram of the site module and its interconnections with the system controller and the DUTs according to an embodiment of the present invention.

FIG. 3 provides a more detailed schematic block diagram of the site module and its interconnections with the system controller and the DUTs in accordance with an embodiment of the present invention.

Referring to FIG. 3, the site modules of the ATE apparatus, in one embodiment, can be mechanically configured onto tester slices 340A-340N, wherein each tester slice comprises at least one site module. In certain typical embodiments, each tester slice can comprise two site modules and two device power supply boards. In other embodiments, the tester slice may comprise more or fewer site modules and/or power supply boards. Tester slice 340A of FIG. 3, for example, comprises site modules 310A and 310B and device power supply boards 332A and 332B. However, there is no limit to the number of device power supply boards or site modules that can be configured onto a tester slice. Tester slice 340 is connected to system controller 301 through network switch 302. System controller 301 and network switch 302 perform the same function as elements 201 and 202 in FIG. 2 respectively. Network switch 302 can be connected to each of the site modules with a 32 bit wide bus.

As mentioned above, in one embodiment, the system controller 301 may be a computer system, e.g., a personal computer (PC) that provides a user interface for the user of the ATE to load the test programs and run tests for the DUTs connected to the ATE 300. Typically the system controller will run the Windows operating system. The Advantest Stylus is one example of test software normally used during device testing.

Each of the device power supply boards 332A-332B can be controlled from one of the site modules 310A-310B. The software running on the tester processor 304 can be configured to assign a device power supply to a particular site module. In one embodiment, the site modules 310A-310B and the device power supplies 332A-332B are configured to communicate with each other using a high speed serial protocol, e.g., Peripheral Component Interconnect Express (PCIe).

In one embodiment, each site module is configured with two FPGAs as shown in FIG. 3. Each of the FPGAs 316 and 318 in the embodiment of FIG. 3. is controlled by the tester processor 304 and performs a similar function to FPGAs 211A-211M in FIG. 2. The tester processor 304 can communicate with each of the FPGAs using a 8 lane high speed serial protocol interface such as PCIe as indicated by system buses 330 and 332 in FIG. 3. In other embodiments, the tester processor 304 could also communicate with the FPGAs using different high speed serial protocols, e.g., Serial AT Attachment (SATA).

FPGAs 316 and 318 are connected to memory modules 308 and 304 respectively, where the memory modules perform a similar function to memory blocks 240A-240N in FIG. 2. The memory modules are coupled with and can be controlled by both the FPGA devices and the tester processor 304.

FPGAs 316 and 318 can be connected to the DUTs 372A-372M on the load board 380 through buses 352 and 354 respectively. The load board 380 is a physical harness that allows a general purpose high speed connection at the site module end that is agnostic to the protocol used to communicate to the DUTs in on lines 352 and 354. At the DUT end, however, the load board needs to be designed so as to have connectors specific to the protocol being used by the DUT.

The DUTs 372A-372M, in one embodiment of the invention, are loaded on a load board 380 that is placed inside a thermal chamber 390 for testing. The DUTs 372A-372M and the load board 380 derive power from the device power supplies 332A and 332B. The DUTs may also connect to the FPGAs through a device interface board.

The number of DUTs that can be connected to each FPGA is contingent on the number of transceivers in the FPGA and the number of I/O lanes required by each DUT. In one embodiment, FPGAs 316 and 318 can each comprise 32 high speed transceivers and buses 352 and 354 can each be 32 bits wide, however, more or less can be implemented depending on the application. If each DUT requires 8 I/O lanes, for example, only 4 DUTs can be connected to each FPGA in such a system.

In one embodiment, the communication protocol used to communicate between the tester processor 304 and the DUTs 372A-M can advantageously be reconfigurable. The communicative protocol engine in such an implementation is programmed directly into one or both of the FPGAs on the tester slice. The FPGA (e.g., 316 or 318) can therefore be configured to communicate with the DUTs in any protocol that the DUTs support. This advantageously eliminates the need for swapping out tester each time a DUT with a different protocol needs to be tested. In one embodiment, the protocols can be high speed serial protocols, including but not limited to UFS, SATA, SAS or PCIe, etc. The new or modified protocols can be downloaded and installed directly on the FPGAs via a simple bit-stream download from the system controller through the tester processor without any kind of hardware interactions. Also, if a new protocol is released, the FPGAs can easily be configured with that protocol via a software download.

In one embodiment of the present invention, each FPGA comprises a number of protocol engine modules, wherein each of the protocol engine modules within a FPGA device can be configured with a different communicative protocol. Accordingly, an FPGA device can be connected to test multiple DUTs, each supporting a different communicative protocol simultaneously. Alternatively, an FPGA device can be connected to a single DUT supporting multiple protocols and test all the modules running on the device simultaneously. For example, if an FPGA is configured to run both PCIe and UFS protocols, it can be connected to test a DUT that supports both PCIe and UFS protocols. Alternatively, it can be connected to test two different DUTs, one DUT supporting the PCIe protocol and the other DUT supporting the UFS protocol.

As mentioned earlier, a drawback of current tester systems is that most off-the-shelf FPGA systems are not configured to provide native support for UFS protocols. The UFS protocol is a high-speed communication protocol between a Host Controller and a memory device. The key benefit of the UFS protocol is that it consumes less power than other protocols, e.g., PCIe. To reduce power usage, the UFS protocol supports varying speed gears, including high speed and low speed gears, and also certain power saving states. However, supporting the different speed gears and power saving states in the UFS specification requires special accommodations in the hardware, e.g., in the FPGA devices of the ATE system illustrated in FIGS. 2 and 3. Also special configurations may need to be made in the hardware because the different speed gears and power saving states may require a different type of signaling than other protocols, e.g., PCIe. UFS is not currently as widely adopted as PCIe and, therefore, off-the-shelf FPGAs do not natively support all the various modes (including the different speed gears and power saving states) specified in the UFS specification. Accordingly, conventional ATE systems that use FPGAs to communicate with DUTs are not able to adequately test DUTs that are UFS-compliant.

Figure 4:
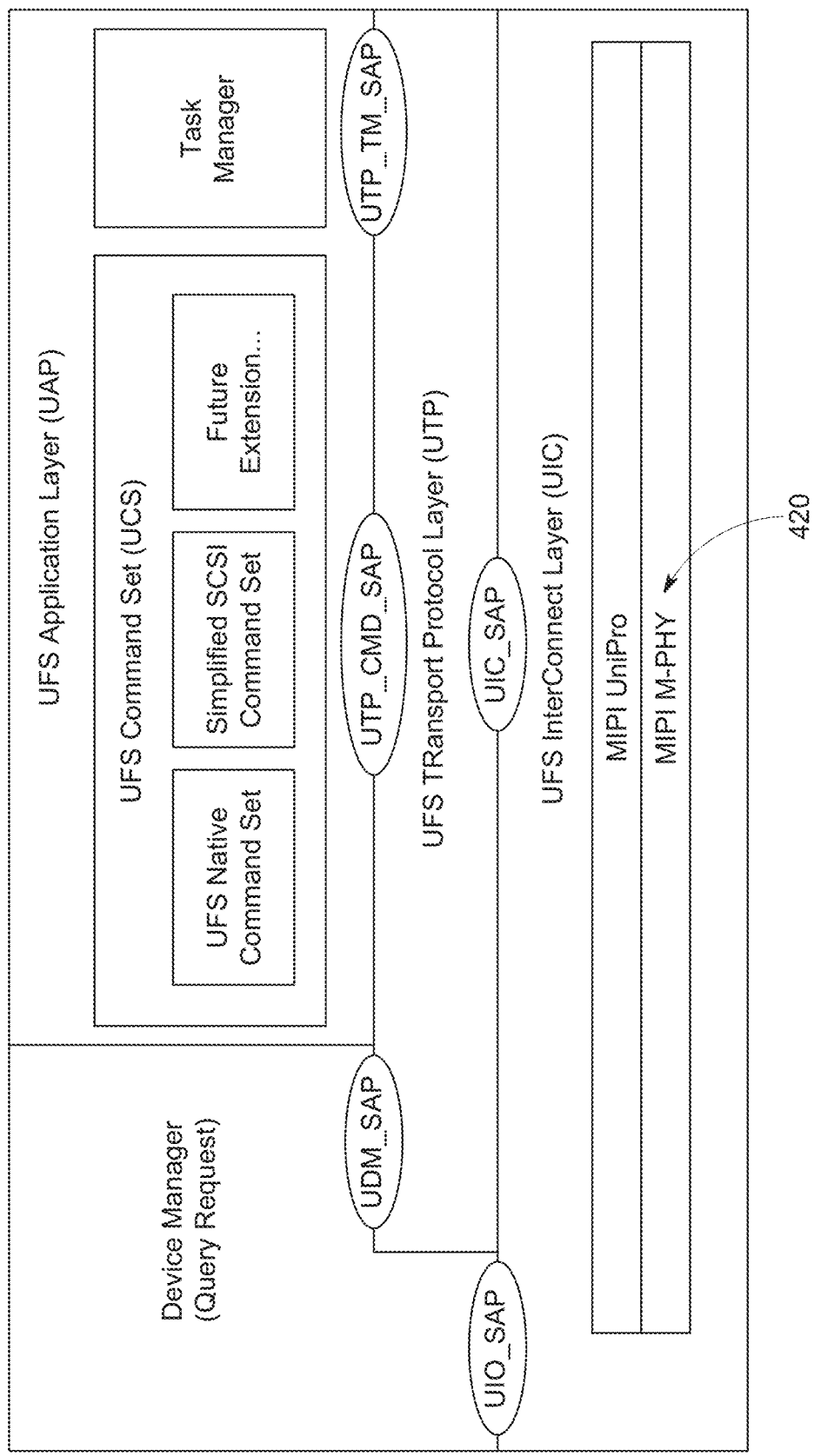
FIG. 4 illustrates the UFS architecture.

FIG. 4 illustrates the UFS architecture. UFS communication is a layered communication architecture. The electrical interface for UFS uses the M-PHY layer 420, the physical layer of the high speed serial interface comprising the board components, PCB channel, and actual voltage signals. Embodiments of the present invention, in particular, configure the FPGAs in the ATE systems to be compatible with the M-PHY layer of the UFS specification.

Figure 5:
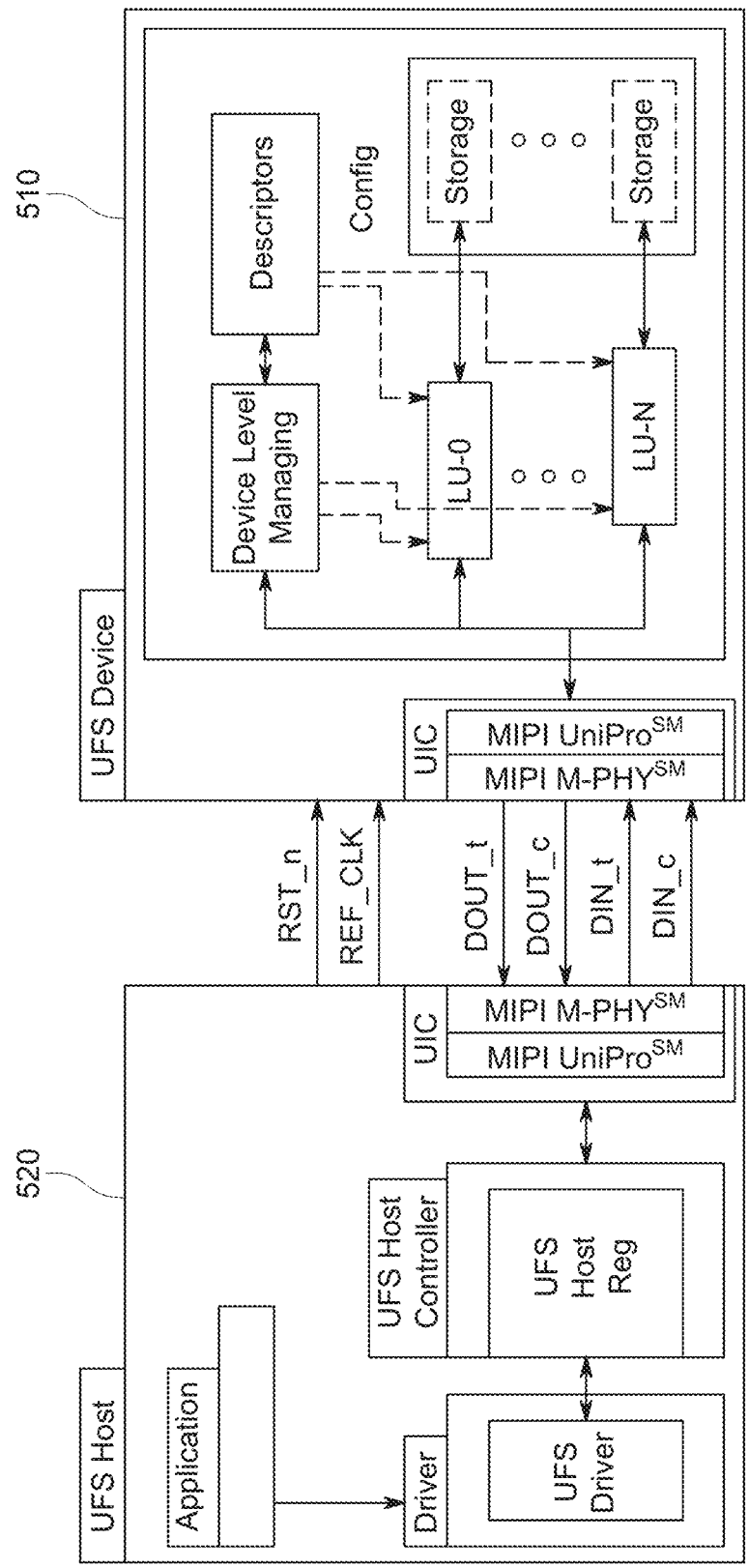
FIG. 5 illustrates a UFS device in communication with a UFS host.

FIG. 5 illustrates a UFS device in communication with a UFS host. As mentioned above, UFS is a high-speed communication protocol between a host controller 520 and a memory device 510. For example, in embodiments of the present invention, FPGAs 316 and 318, the host controllers, would communicate with and control the UFS-compliant DUTs, the memory devices. However, as mentioned above, in order to connect with and test multiple UFS-compliant DUTs concurrently, the FPGA devices in the ATE systems need to be customized to provide support for certain modes specified in the UFS specification and also the different power saving states.

As mentioned above, in one embodiment, the interface or IP core, e.g., a UFS IP core in an FPGA, e.g., FPGA 316 or 318, may be acquired from a third party vendor but may require some customization to be compatible with the embodiments described herein.

Embodiments of the present invention provide a tester system wherein the FPGA devices are configured with the UFS IP core, which allows them to connect with and test multiple UFS-compliant DUTs concurrently. In one embodiment, the FPGA devices in the ATE systems are customized to provide support for certain modes (e.g., high and low speed gears and certain power saving states) specified in the UFS specification.

Embodiments of the present invention use the high-speed differential Serializer/Deserializer (SerDes) channels in off-the-shelf FPGAs to communicate with UFS-compliant DUTs. A UFS Host (e.g., an FPGA), compliant to the UFS 3.0 standard, will typically need to support 4 speed modes, referred to as gears, in high-speed mode. It may also need to support various low speed gears. FIG. 6 illustrates line rates for both high-speed and low-speed gears as required by the UFS specification. For example, in High Speed Rate B Series operation, the speed for Gear4 (G4) is 11.66 Gbps, the speed for G3 is 5.83 Gbps, the speed for G2 is 2.915 Gbps and the speed for G1 is 1.457 Gbps. The UFS Host (e.g., an FPGA) and the UFS device (e.g., a DUT being tested by the tester) need to transfer data between each other at different speed rates in each gear mode as shown in FIG. 6.

Table 1 of FIG. 6 illustrates the high-speed rates (for Rate A-series and Rate B-series) for the four different high-speed gears. Table 2, of FIG. 6, on the other illustrates the minimum and maximum rates for the various low-speed gears (also known as the PWM-Burst gears). When a tester is in communication with a DUT, at any given time, the FPGA host within the tester will be communicating with the DUT at a particular line rate (or in one of the gears listed in FIG. 6).

One scheme that may be employed to allow an FPGA host to support the different high-speed line rates on the SERDES channel may involve configuring a transceiver in the host FPGA that serializes the data/control bits to operate using the G4 line rate (the highest gear as shown in Table 1 of FIG. 6) with a single reference clock. In order to support other gear speeds lower than G4 (e.g., G3, G2, G1) then an oversampling technique may be employed wherein the bits are transmitted ×2, ×4, or ×8 for G3, G2 and G1 gears respectively. Because this oversampling leads to longer periods of high and low signal values at gear speeds lower than G4 (e.g., G3, G2, G1), the transceiver's Clock Data Recovery (CDR) circuit may not effectively adapt to the received bit streams. This condition generates data corruptions in the lower gears (e.g., G3, G2, G1) and is not effective.

To resolve this problem, embodiments of the present invention change the physical line rate (or line speed) of the SERDES channel itself for each gear implemented. In other words, instead of fixing the operating line rate (e.g., at the G4 speed) and employing an oversampling technique to support the lower speed gears, embodiments of the present invention advantageously change the line rate to the actual speed supported by the high-speed gear, e.g., 5.83 Gbps for G3, 2.915 Gbps for G2 and 1.457 Gbps for G1. This prevents the data being transmitted on the SERDES channel from being corrupted in lower speed gears, e.g., G3, G2 and G1.

Figure 7:
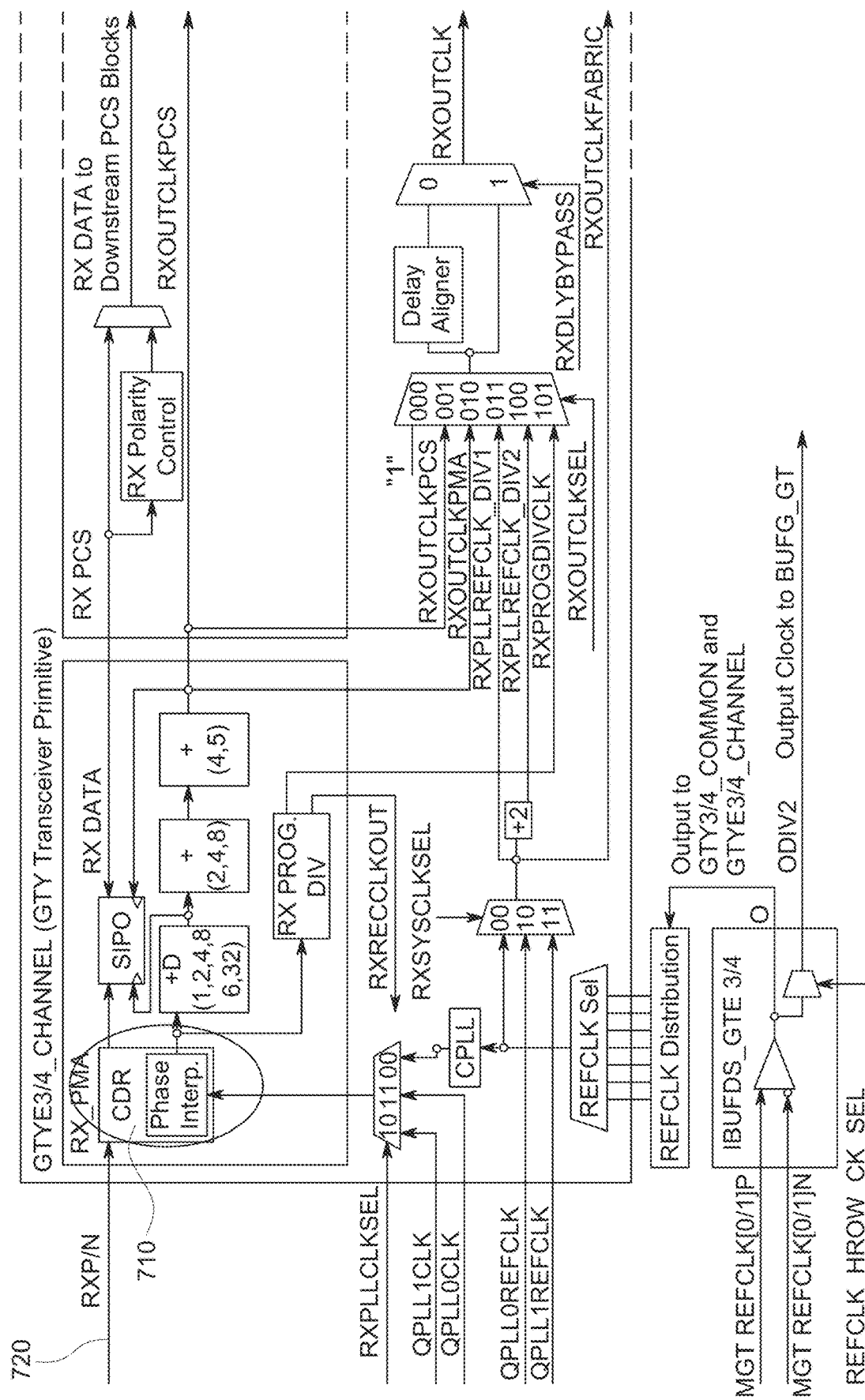
FIG. 7 illustrates clocking logic for the FPGA SERDES receiver path.

FIG. 7 illustrates clocking logic for the FPGA SERDES receiver path. The FPGA SERDES receiver path uses a clock data recovery (CDR) circuit 710, along with a set of clock dividers, to extract the clock and data from the serial input 720 at the current line rate, to parallelize the data, and deliver the parallel data to additional circuitry within the FPGA. The CDR circuit 710 comprises a set of CDR attributes, wherein the CDR attributes configure the CDR to work at a particular line rate. In other words, the CDR attributes define the configuration of the CDR including the line rate at which the CDR is operating.

FIG. 8 illustrates a sub-set of CDR attributes that change for the different UFS gear speeds (or line rates) and the corresponding Dynamic Reconfiguration Port (DRP) addresses as required by the FPGA specification. The CDR attributes can be dynamically changed by writing different values into a DRP register(s). For example, by loading a new set of attributes into the DRP register(s), the CDR can be configured to work at a particular line rate. For example, when switching from G4 to G2, if the line rate needs to be decreased, a new set of values may need to be loaded into the DRP to change the corresponding CDR attributes, including, the new G2 line rate.

It should be noted that for the low-speed gears (PWM-Burst gears shown in Table 2 on FIG. 6), embodiments of the present invention use the high speed G4 settings to configure the CDR to work at the line rate of 11.6736 Gbps. (the high speed G4 Rate B-series line rate indicated in Table 1 of FIG. 6). In other words, for the low-speed gears shown in Table 2 of FIG. 6, embodiments of the present invention fix the operating line rate at the G4 speed and employ an oversampling technique to support the PWM-Burst gears. Because the data in the low speed gears of Table 2 is relatively much slower than the high speed gears (shown in Table 1), oversampling for the low speed gears does not create a problem. The Clock Data Recovery (CDR) circuit is able to effectively adapt to the received bit streams despite the oversampling.

Figure 9:
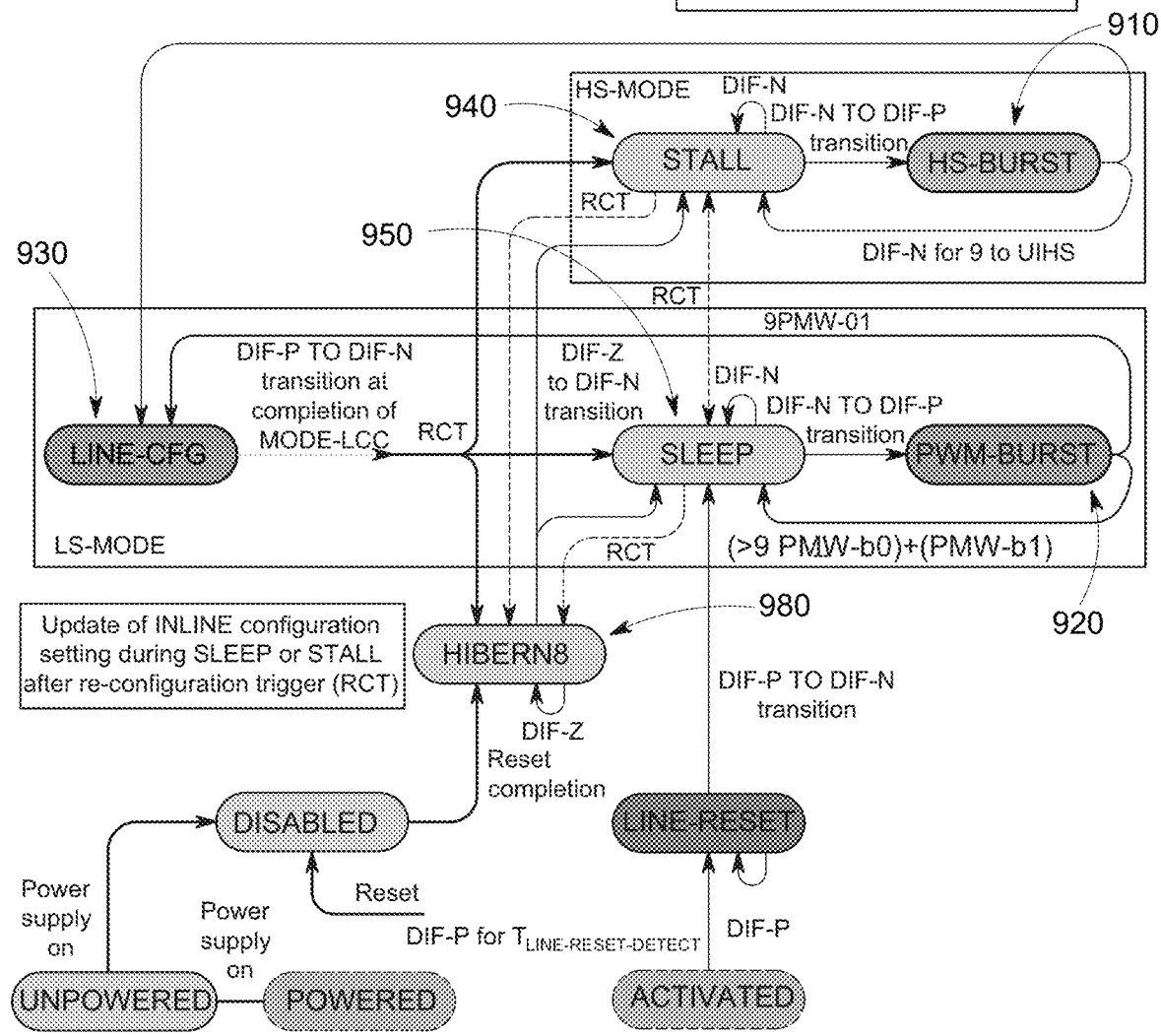
FIG. 9 illustrates the state diagram for Type-I M-Rx that comprises the HS-BURST state, the PWM-BURST state and various power saving states supported by the UFS specification.

FIG. 9 illustrates the state diagram for Type-I M-Rx that comprises the HS-BURST state, the PWM-BURST state and various power saving states supported by the UFS specification. For example, as shown in FIG. 9, the UFS specification comprises several power saving states, e.g., STALL 940, SLEEP 950 and HIBERN8 980. In the power saving states no data is transferred. In the HS-BURST state 910, data is transferred at the high speed line rates (shown in Table 1 of FIG. 6). In the PWM-BURST state 920, data is transferred at the low speed line rate (shown in Table 2 of FIG. 6). In order to transition from the high speed gear to the low speed gear or vice-versa, the LINE-CFG state 930 is used as the intermediary state. When the appropriate state transition conditions are satisfied, the host FPGA can transition between the different states, e.g., the power saving states (e.g., STALL 940, SLEEP 950 and HIBERN8 980) and the data transmit states (e.g., the HS-BURST 910 and PWM-BURST 920).

Figure 10:
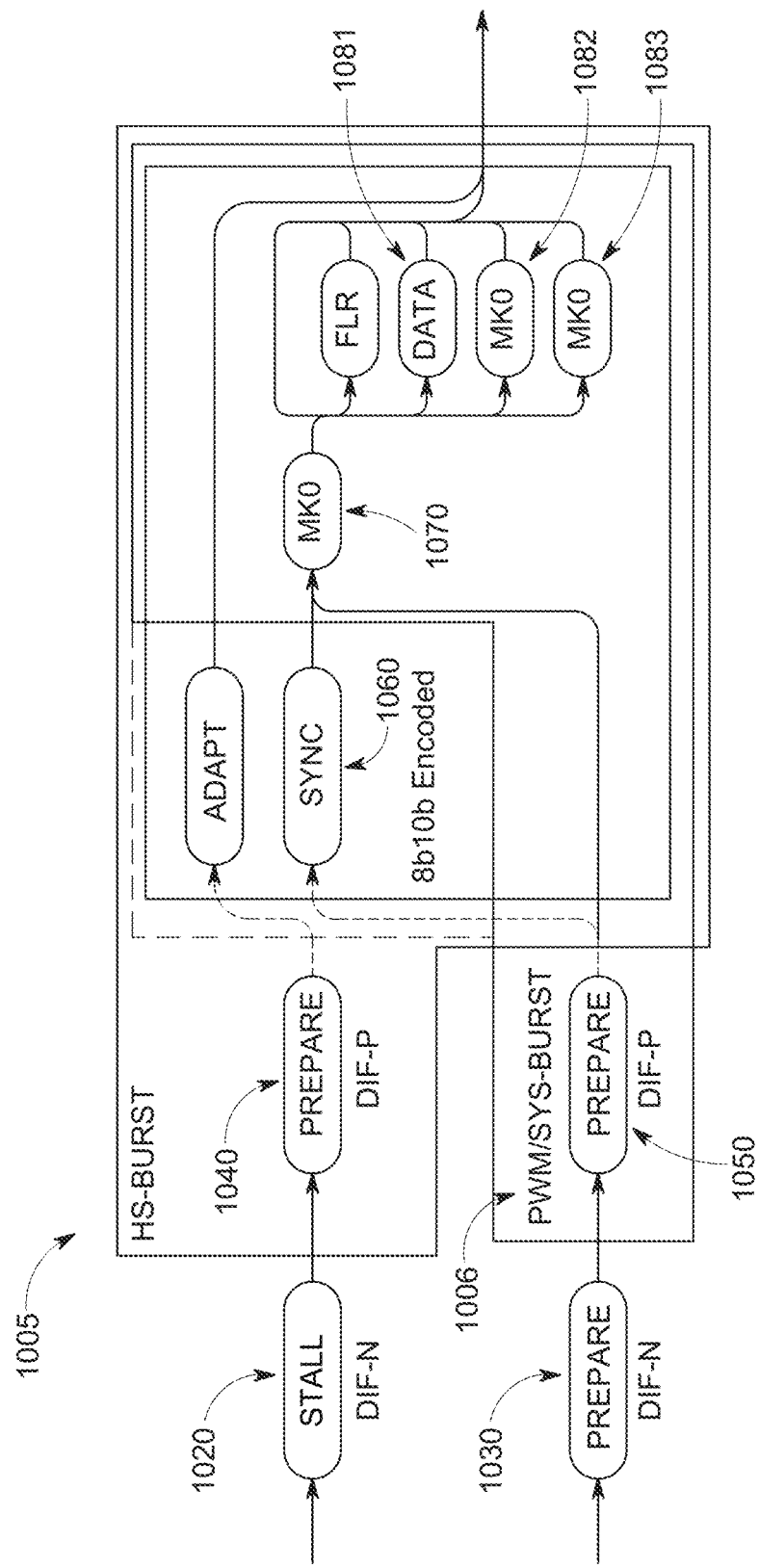
FIG. 10 illustrates details of the sub-states that are comprised within the data transmit states HS-BURST and PWM-BURST in accordance with an embodiment of the present invention.

FIG. 10 illustrates details of the sub-states that are comprised within the data transmit states HS-BURST and PWM-BURST in accordance with an embodiment of the present invention. The power saving state associated with the HS-BURST state 1005 is the STALL state 1020. In the STALL state 1020, the transceiver is in a DIF-N logic state (a low logic state). In order to begin receiving data in the HS-BURST mode 1005, a short duration of DIF-P (a high logic state) needs to be received from an UFS DUT. Typically, the DIF-N logic state switches to the DIF-P logic state which is a transition from STALL state 1020 to PREPARE sub-state 1040. The PREPARE sub-state 1040 comprises a constant period of DIF-P logic state that marks the beginning of a HS-BURST 1005.

Subsequent to the PREPARE state 1040, within the HS-BURST mode 1005, the SYNC sub-state 1060 receives a SYNC sequence which is intended for bit synchronization with the CDR. Within the SYNC sub-state 1060, 8b10b encoded data is transmitted to allows the CDR to synchronize with the burst. The SYNC data does not comprise actual data—it is a predetermined pattern that is transmitted for a predetermined amount of time to allow the CDR to synchronize with the incoming stream of bits. The CDR typically requires a stream of bits at a certain speed with a certain number of transitions in order to synchronize with the burst. The function of the SYNC pattern is to provide such a stream to the CDR to allow it to synchronize with an incoming data burst.

Once synchronization with the incoming bit stream has been established, the state transitions to the data transfer phase. The data within the HS-BURST is actually transferred starting with the MK0 1070 symbol. The incoming data stream has already synced up with the CDR in the SYNC state 1060 and, accordingly, valid data can begin to be transferred starting with the MK0 1070 symbol. It should be noted that the CDR circuit converts incoming serial data to parallel data and, accordingly, data is transferred starting with the MK0 1070 symbol in parallel form. Furthermore, the data transferred is 8b10b encoded data. In data transfer phase, the CDR receives MK0 symbol 1070, DATA symbol 1081, additional MK0 symbol 1082 if any and other MKn symbols 1083 as needed. MK2 and MK4 are examples of MKn symbols. All these symbols are transferred to the circuits within the FPGA in parallel form. The data transfer phase comprises several markers that mark boundaries for the payload data, wherein MK0 is the initial marker and MK2 is the final marker.

If the line rate needs to be switched, for example, from the G4 high-seed gear to the G2 high-speed gear, it can only be switched during the SYNC state 1060 in accordance with embodiments of the present invention. As noted above, conventional testers, including host FPGA devices, did not provide support for all the different high-speed gears supported by the UFS protocol. More specifically, conventional testers did not allow the host FPGA to switch the line rates to conform to different high-speed gear speeds. Embodiments of the present invention permit the line rate to switch between G4, G3, G2 and G1, but the switching needs to take place in the SYNC state 1060 to establish synchronization with the CDR prior to the actual data transfer starting with the MK0 symbol 1070.

Whenever a gear change needs to be implemented, the CDR attributes need to be updated for the corresponding line rate using the DRP register during the SYNC sub-state 1060 to avoid any data loss. In one embodiment, the DRP register is modified using a read-modify-write mechanism. In other words, the current attribute values in the DRP register is read, and then only the bits that need to be modified are flipped during the write phase to update to a new attribute value.

In one embodiment, the CDR attribute values are only updated during the SYNC state 1060 to allow some time for the CDR to stabilize and synchronize with the incoming stream of bits before data at the new line rate is received. Line rate change is performed during a time when no payload data is received so that there is no data loss due to the rate change. In one embodiment, the CDR attributes cannot be changed or updated while data is being transferred starting with the MK0 symbol 1070.

The power saving state associated with the PWM-BURST state 1006 is the SLEEP state 1030. In the SLEEP state 1030, the transceiver is in a DIF-N logic state (a low logic state). In order to begin receiving data in the PWM-BURST mode 1006, a DIF-P may be received from a UFS DUT in the PREPARE state. Typically, the DIF-N logic state switches to the DIF-P logic state and the state transitions to the PREPARE state 1050. The PREPARE state 1050 comprises a constant DIF-P logic state that marks the beginning of a data burst.

Subsequent to the PREPARE state 1050, within the PWM-BURST mode 1006, the data is transferred starting with the MK0 symbol 1070. The PWM-BURST mode 1006 does not require a SYNC state 1060 because the data is at a slow enough speed to allow the CDR to receive the data without getting compromised. In other words, in low speed, there is no SYNC state because the low speed ensures that the MK0 and actual data is received after the rate change is already implemented. If there is any potential corruption in the received data due to rate change, it happens prior to the MK0 state. The transceiver uses the end of the PREPARE state 1050 to start the rate change. The rate change happens between PREPARE 1050 and MK0 1070. Because data in the low speed gears is coming in at a slow speed, and there is enough of a transition gap between PREPARE state 1050 and MK0 1070, there is no impact on data reception from not having a dedicated SYNC state for the low speed gears.

As noted above, for the low-speed gears, embodiments of the present invention use the high speed G4 settings to configure the CDR to work at the line rate of 11.6736 Gbps. (the high speed G4 Rate B-series line rate indicated in Table 1 of FIG. 6). In other words, for the low-speed gears shown in Table 2 of FIG. 6, embodiments of the present invention fix the operating line rate at the G4 speed and employ an oversampling technique to support the PWM-Burst gears. Because the data in the low speed gears of Table 2 is relatively much slower than the high speed gears (shown in Table 1), oversampling for the low speed gears does not create a problem. The Clock Data Recovery (CDR) circuit is able to effectively adapt to the received bit streams despite the oversampling.

Figure 11:
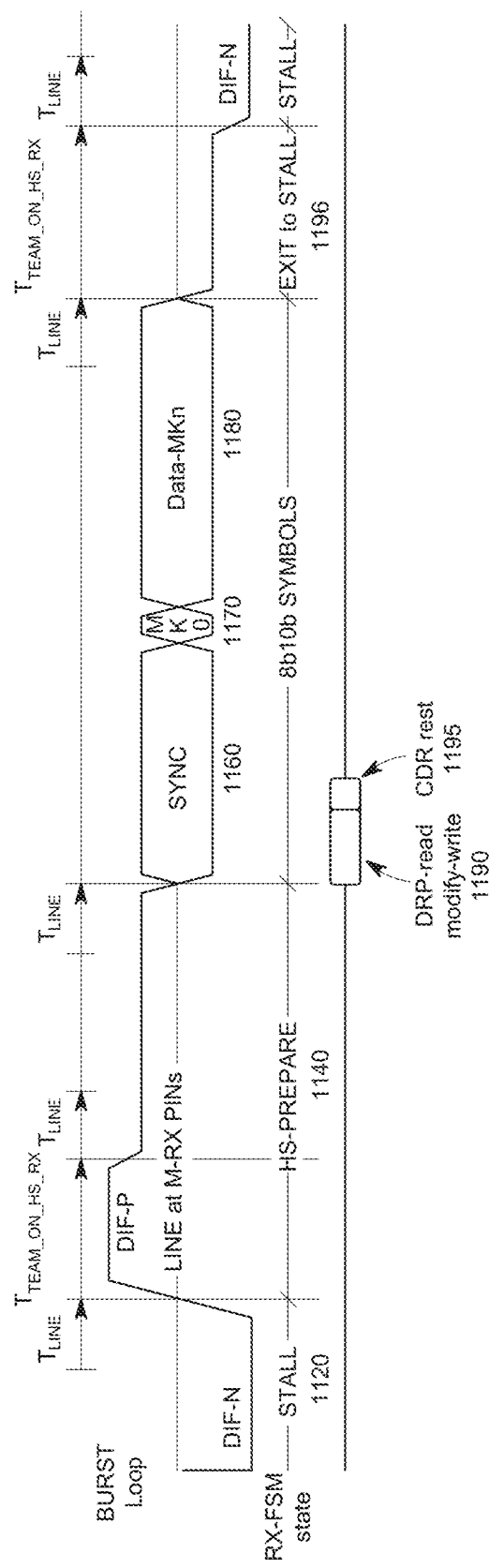
FIG. 11 is a timing diagram illustrating the manner in which data is received during a HS-BURST phase in accordance with an embodiment of the present invention.

FIG. 11 is a timing diagram illustrating the manner in which data is received during a HS-BURST phase in accordance with an embodiment of the present invention. It also shows the timing of the line rate change occurrence. During the STALL phase 1120, the FPGA Host transceiver is in a DIF-N logic state (a low logic state). In order to begin receiving data in the HS-BURST mode, a DIF-P may be received from an UFS DUT. Subsequently, the DIF-N logic state switches to the DIF-P logic state and the state transitions to the PREPARE state 1140 as shown in the timing diagram of FIG. 11. The PREPARE state 1140 comprises a constant period of DIF-P logic state that marks the beginning of a data burst.

Subsequent to the PREPARE state 1140, within the HS-BURST mode 1005, the SYNC sub-state 1160 receives a SYNC sequence which is intended for bit synchronization with the CDR. As noted above, within the SYNC sub-state 1160, 8b10b encoded data is transmitted to allows the CDR to synchronize with the burst. It is within the SYNC sub-state 1160 that any line rate changes will be implemented.

Embodiments of the present invention permit the line rate to switch between G4, G3, G2 and G1, but the switching needs to take place in the SYNC state 1060 to establish synchronization with the CDR prior to the actual data transfer starting with the MK0 symbol 1170.

Whenever a gear change needs to be implemented, the CDR attributes need to be updated for the corresponding line rate using the DRP register during the SYNC sub-state 1160 to avoid any data loss. As noted above, in one embodiment, the DRP registers are modified using a read-modify-write mechanism. In other words, the current attribute values in the DRP register is read, and then only the bits that need to be modified are flipped during the write phase to update to a new attribute value. As shown in the timing diagram of FIG. 11, during the SYNC phase 1160, the DRP registers are modified using a read-modify-write mechanism 1190. Subsequently, a CDR reset 1195 is performed in order to effectuate the new line rate. The CDR requires a reset sequence so the new DRP settings can take effect. To allow sufficient time for the transceiver's CDR to adapt to the new line rate, the duration of the SYNC phase 1160 will be extended to the optimum period.

Subsequent to the line rate change (following the CDR reset) and establishing synchronization at the new line rate during the SYNC phase 1160, the data is received starting with the MK0 symbol 1170. The data continues to be received during sub-state 1180, wherein further data and markers are received. MK0 marks the start of the payload data set while MK2, for example, marks the end of the payload data. Once the burst is received, the transceiver can transition through the "Exit to STALL" state 1196 and eventually return to the STALL state 1120. From there on, if another line rate change is required, the transceiver will have to again exit the STALL state, wait for the end of PREPARE state, modify DRP registers, reset the CDR and re-establish synchronization during the SYNC state 1160.

By allowing the line rate to switch between the various high speed gears (e.g., G4, G3, G2 and G1), embodiments of the present invention eliminate data corruption in different high speed gears by avoiding oversampling the data. In effect, embodiments of the present invention improve the stability in various high speed gear operations and also help improve throughput by reducing unwanted retries.

Figure 12:
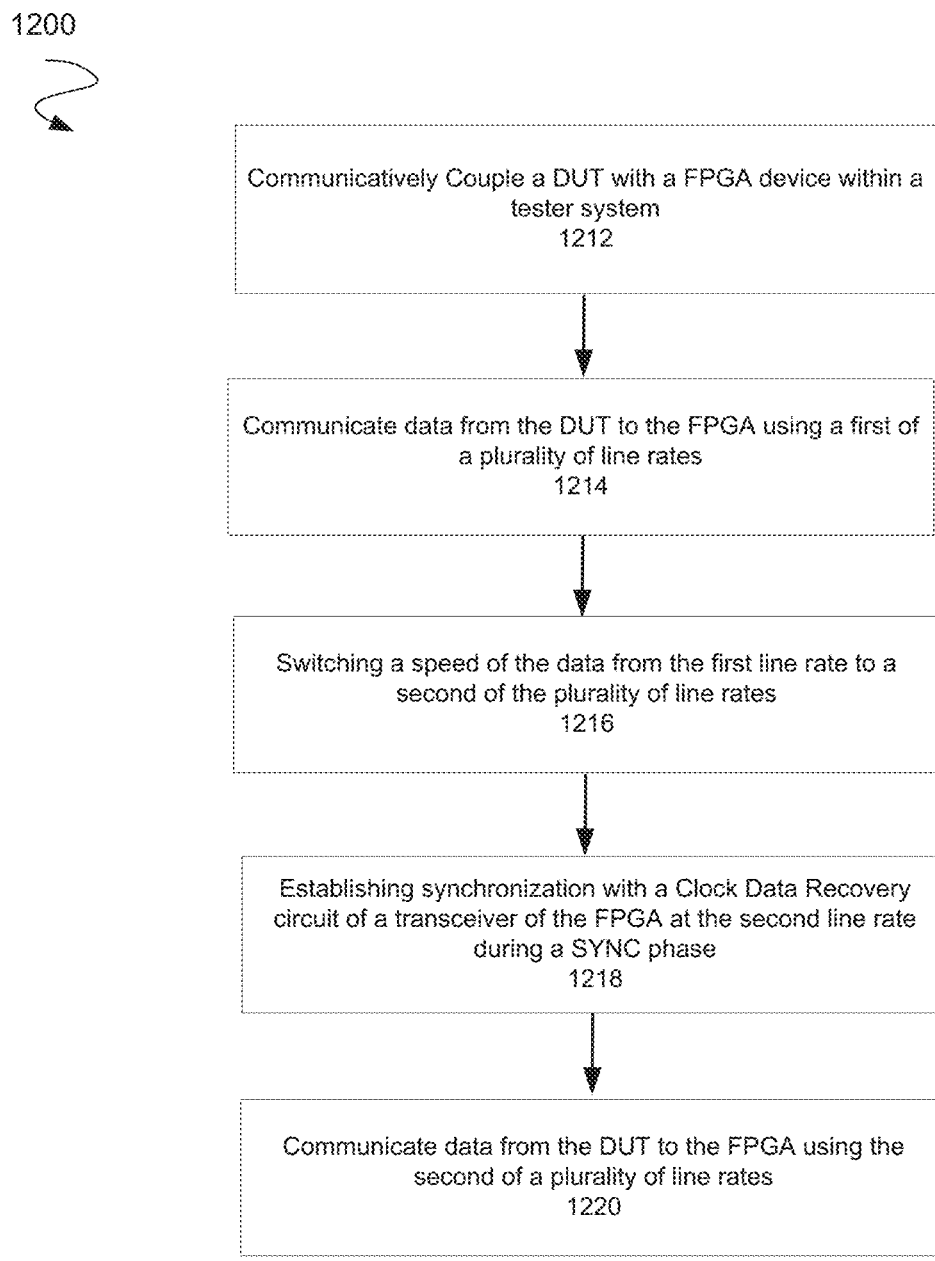
FIG. 12 depicts a flowchart of an exemplary process of communicating data between a DUT and an FPGA transceiver in a tester system using the UFS protocol according to an embodiment of the present invention.

FIG. 12 depicts a flowchart 1200 of an exemplary process of communicating data between a DUT and an FPGA transceiver in a tester system using the UFS protocol according to an embodiment of the present invention. The invention, however, is not limited to the description provided by flowchart 1200. Rather, it will be apparent to persons skilled in the relevant art(s) from the teachings provided herein that other functional flows are within the scope and spirit of the present invention.

At block 1212, a UFS-compliant DUT is communicatively coupled with an FPGA (e.g., FPGA 316 and 318) transceiver in a tester system for testing purposes.

At block 1214, the DUT transmitter communicates data to the FPGA using a first of a plurality of line rates (e.g., high speed rates G4, G3, G2, G1, etc.). The data may be communicated as part of a high speed burst or a PWM burst.

At block 1216, the line rate switches from a first of the plurality of line rates to a second of the plurality of line rates. For example, the line rate may switch from G4 to G3. This means that the DUT will be transmitting to the FPGA Host using a different line rate than before.

At block 1218, synchronization is established with the clock data recovery (CDR) circuit of the transceiver in the FPGA at the second line rate. In one embodiment, the synchronization is established during a SYNC state of the transceiver. In one embodiment, in order to synchronize at the new line rate, the bits of the DRP register are modified using a Read-Modify-Write procedure followed by a reset of the CDR circuit.

At block 1220, the DUT transmitter communicates data to the FPGA using the second of the plurality of line rates during the high speed burst.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. An automated test equipment (ATE) system comprising:
   a computer system comprising a system controller communicatively coupled to a tester processor and a Field Programmable Gate Array (FPGA);
   wherein the FPGA is communicatively coupled to the tester processor, and is configured to internally generate commands and data transparently from the tester processor for testing a Device Under Test (DUT); and
   wherein the FPGA comprises a transceiver circuit configured to:
      receive payload data from the DUT using a first rate of a plurality of line rates during a first burst;
      transition to a power saving state at an end of the first burst;
      receive synchronization data from the DUT using a second rate of a plurality of line rates during a second burst;
      establish synchronization with a clock data recovery (CDR) circuit of the transceiver at the second rate; and
      receive payload data from the DUT at the second rate.

2. The ATE system of claim 1, wherein the first burst and the second burst comprise high speed bursts.

3. The ATE system of claim 1, wherein one of the first burst and the second burst is a Pulse Width Modulated (PWM) burst.

4. The ATE system of claim 1, wherein the synchronization is established during a dedicated state during which a predetermined pattern is transmitted by the DUT to enable the CDR circuit to synchronize to incoming data.

5. The ATE system of claim 1, wherein to establish synchronization, the transceiver circuit is further configured to:
   modify bits of a Dynamic Reconfiguration Port (DRP) register associated with the CDR circuit to program a value associated with the second rate; and
   reset the CDR circuit.

6. The ATE system of claim 5, wherein to modify bits of the DRP register the transceiver circuit is further configured to use a Read-Modify-Write scheme.

7. The ATE system of claim 1, wherein the FPGA transceiver and the DUT are configured to communicate using a Universal Flash Storage (UFS) protocol.

8. The ATE system of claim 1, wherein the CDR circuit of the transceiver circuit coverts payload data and MKn symbols from the DUT into parallel data for transmission to additional circuits within the FPGA.

9. The ATE system of claim 1, wherein one of the first burst and the second burst is a high speed burst.

10. The ATE system of claim 1, wherein the first burst is a Pulse Width Modulated (PWM) burst and wherein the second burst is a high speed burst.

11. The ATE system of claim 1, wherein the first burst is a high speed burst and wherein the second burst is a Pulse Width Modulated (PWM) burst.

12. A method for receiving data using an FPGA receiver circuit, the method comprising:
   receiving payload data from a Device Under Test (DUT) using a first rate of a plurality of line rates during a first burst, wherein the DUT is communicatively coupled to the FPGA receiver circuit;
   transitioning to a power saving state at an end of the first burst;
   receiving synchronization data from the DUT using a second rate of a plurality of line rates during a second burst;
   establishing synchronization with a clock data recovery (CDR) circuit of the Field Programmable Gate Array (FPGA) receiver circuit at the second rate; and
   receiving payload data from the DUT at the second rate.

13. The method of claim 12, wherein an FPGA within which the FPGA receiver circuit is comprised is configured to internally generate commands and data for testing the DUT.

14. The method of claim 13, wherein the FPGA is comprised within a tester system comprising a system controller communicatively coupled to a tester processor and the FPGA, wherein the FPGA is communicatively coupled to the tester processor, and wherein the FPGA is configured to internally generate commands and data transparently from the tester processor for testing the DUT.

15. The method of claim 12, wherein the first burst and the second burst comprise high speed bursts.

16. The method of claim 12, wherein the establishing synchronization is performed during a dedicated state during which a predetermined pattern is transmitted by the DUT to enable the CDR to synchronize to incoming data.

17. The method of claim 12, wherein the establishing synchronization further comprises:
modifying bits of a Dynamic Reconfiguration Port (DRP) register associated with the CDR circuit to program a value associated with the second rate; and
resetting the CDR circuit.

18. The method of claim 17, wherein the modifying bits of the DRP register comprises using a Read-Modify-Write scheme.

19. The method of claim 12, wherein the FPGA receiver circuit and the DUT are configured to communicate using a Universal Flash Storage (UFS) protocol.

20. The method of claim 12, wherein the FPGA receiver circuit is configured as part of a Serializer/Deserializer (SERDES) channel to receive data from the DUT.

21. The method of claim 12, wherein one of the first burst and the second burst is a PWM burst, and further wherein one of the first burst and the second burst is a high speed burst.

22. An automated test equipment (ATE) apparatus comprising:
a Field Programmable Gate Array (FPGA) communicatively coupled to a Device Under Test (DUT) using a Universal Flash Storage (UFS) protocol over a Serializer/Deserializer (SERDES) channel;
wherein the FPGA comprises a receiver circuit, and wherein the receiver circuit is configured to:
receive payload data from the DUT using a first rate of a plurality of line rates during a first burst;
transition to a power saving state at an end of the first burst;
receive synchronization data from the DUT using a second rate of a plurality of line rates during a second burst during a dedicated state for performing synchronization;
establish synchronization with a clock data recovery (CDR) circuit of the receiver circuit at the second rate; and
receive payload data from the DUT at the second rate.

23. The ATE apparatus of claim 22, wherein to establish synchronization, the receiver circuit is further configured to:
modify bits of a Dynamic Reconfiguration Port (DRP) register associated with the CDR circuit to program a value associated with the second rate; and
reset the CDR circuit.

24. The ATE apparatus of claim 23, wherein to modify bits of the DRP register the receiver circuit is further configured to use a Read-Modify-Write scheme.

* * * * *